United States Patent Office 2,737,528
Patented Mar. 6, 1956

2,737,528

PROCESS FOR PREPARATION OF ACETYL ACETONE

Charles Fraser Hunt, Shawinigan Falls, Quebec, Canada, assignor to Shawinigan Chemicals Limited, Montreal, Quebec, Canada, a corporation of Canada No Drawing. Application September 1, 1953, Serial No. 377,961

8 Claims. (Cl. 260—593)

This invention relates to an improved process for preparing acetyl acetone from acetyl chloride and aluminum chloride.

Combes, as reported in Compte rendus, 103, 814–817, (1886) and Annales de Chimie, 12, 199–275 (1887), prepared acetyl acetone by reacting six moles of acetyl chloride with two moles of anhydrous aluminum chloride in the presence of an inert liquid, followed by separation and decomposition of the resultant solid organometallic complex with water to give the required product, which was recovered by extraction.

The present invention provides a process for the production of acetyl acetone comprising reacting acetyl chloride with anhydrous aluminum chloride in the presence of an inert water-immiscible liquid diluent which is solvent for the acetyl chloride and nonsolvent for the resultant organometallic complex, to precipitate an organometallic complex, decomposing the organometallic complex, in the presence of the remainder of the reaction mixture, with aqueous sulfuric acid to form acetyl acetone and to separate the reaction mixture into an aqueous layer and an inorganic layer, and recovering the acetyl acetone from the organic layer, for example by fractional distillation. Additional small quantities of acetyl acetone may be recovered from the aqueous layer by extraction processes as is well known in the art.

Combes used the reactants in the proportion of six moles of acetyl chloride to two moles of anhydrous aluminum chloride (AlCl$_3$) and postulated the initial reaction to be:

6CH$_3$COCl+2AlCl$_3$=
[(CH$_3$CO)$_2$CHCCl$_2$.O.AlCl$_2$]$_2$+4HCl

However, I found when using the reactants in these proportions that only about three-quarters of the acetyl chloride is converted into the complex and that essentially complete conversion is attained when using the reactants in the proportions indicated by the following reaction proposed as the mechanism of the first stage:

9CH$_3$COCl+4AlCl$_3$=Al(C$_6$H$_6$O$_3$AlCl$_4$)$_3$+9HCl   (B)

Moreover, the amount of hydrochloric acid liberated in the initial stage of the reaction is consistent with Equation B rather than with Equation A.

The separation of the organometallic complex from the reaction mixture and its decomposition, as practised in the prior art, are separate steps which are obviously disadvantageous for a commercial process. I have found that these separate steps may be combined by carrying out the decomposition in the reaction mixture with aqueous sulfuric acid. This causes the formation of an aqueous layer, immiscible with the organic layer; the aluminum sulfate formed remains in solution or partially precipitates out depending upon the amount of water in the aqueous sulfuric acid. The organic layer containing by far the greater part of the acetyl acetone is easily separable from the aqueous layer and the precipitate, if any, of aluminum sulfate. The sulfuric acid is preferably used in slight excess of the stoichiometric equivalent of the aluminum chloride initially used, to be quite sure of the decomposition of all the compound of aluminum with acetyl acetone,

(C$_5$H$_7$O$_2$)$_3$Al and preferably contains water in amount sufficient to hold in solution all aluminum salts to avoid difficulties in dealing with a solid phase. It is obvious that alternatively part of the water preferably used to hold in solution all the aluminum salts present may be added as a separate step subsequent to the decomposition of the complex with sulfuric acid. Excess water should be avoided as it would diminish the salting-out effect of the aluminum salts and would involve the handling of larger volumes for no advantage.

Undesirably large volumes of water are required if water alone is used to bring about the decomposition as in the prior art. These large volumes of water dissolve part of the acetyl acetone and detract from the yield thereof in the organic layer; furthermore, I have some reason to believe that even relatively large volumes of water leave some of the compound of aluminum with acetyl acetone undecomposed and in solution in the organic layer. The amount of water required to hold the aluminum salts in solution is much less than that used in the method of decomposing the complex by water alone, so that the concentration of inorganic salts is higher and the salting-out effect is more pronounced. Thus there is less product held in solution in the aqueous solution when using the acid decomposition method than when decomposing the complex water alone.

The following examples illustrate the invention. Analyses of the products of the examples for their content of acetyl acetone were carried out by the method of Seaman, Woods, and Massad reported in Anal. Chem. 19, 250 (1947).

*Example 1*

810 grams of chloroform, 150 grams of anhydrous aluminum chloride, and 200 grams of acetyl chloride were consecutively placed in a reactor equipped with a reflux condenser, an anchor-type stirrer, and a water jacket. With the stirrer in operation, the reactants were gently heated, whereupon hydrogen chloride gas began to be evolved. It was absorbed in a water scrubber beyond the condenser. After about five minutes the originally heterogeneous charge became homogeneous, and after about five minutes more a precipitate appeared and increased in amount as the reaction proceeded. The charge originally refluxed with a vapour temperature of 54° C., which gradually increased during five hours to 61° C. where it remained unchanged for one hour; the evolution of hydrogen chloride gas began to decrease after about 100 minutes and was practically stopped at five hours.

After six hours reaction as noted above, the slurry produced by the first stage of the reaction was cooled to about 15° C. and 580 grams of an aqueous solution of sulfuric acid (31% H$_2$SO$_4$ by weight) was added with stirring, over a period of about 40 minutes, very slowly at first, then more rapidly, the temperature of the charge being kept below about 30° C. Water was then added to give a clear aqueous layer, 350 grams being used. After permitting sharp demarcation of the two layers, the liquids were cooled to about 25° C. and separated. The organic layer was fractionally distilled; the fraction boiling at 130°–133° C. amounted to 73.6 grams. Extraction of the aqueous layer with chloroform and distillation of the extract gave a further quantity of 4.8 grams boiling within the same range. These 78.4 grams of product contained 70.3 grams of acetyl acetone, corresponding to a yield of 82.5% of theoretical, based on three moles of acetyl chloride per mole of acetyl acetone.

Example 2

The procedure of Example 1 was repeated in a similar but larger apparatus using 5,050 grams of chloroform, 750 grams of aluminum chloride, and 1,000 grams of acetyl chloride. The charge refluxed first with a vapor temperature of 49° C., which gradually increased during eleven hours to 61° C. The evolution of hydrogen chloride began during the initial heating, continued vigorously for five hours, then tapered off and was practically stopped at eleven hours. The charge was then cooled to about 15° C. and treated with 2,900 grams of aqueous sulfuric acid (31% $H_2SO_4$ by weight) which was added very slowly at first, then more rapidly, over a period of 285 minutes, during which the temperature of the charge was maintained below 30° C. The charge was then further diluted with 1,000 grams of water and heated to 50° C. with stirring. The two clear layers were then allowed to separate and were cooled to room temperature, causing crystallization of the aluminum sulfate in the aqueous layer. The chloroform layer was then removed and fractionally distilled. The fraction boiling at 133.5°–140° C. amounted to 348 grams. An additional 20 grams of material with a similar boiling range was obtained by extraction of the aqueous layer after dilution to dissolve the crystals. The total yield of 368 grams of impure product containing 93.5% acetyl acetone or 344 grams of pure acetyl acetone corresponds to 80.9% of the theoretical yield based on three moles of acetyl chloride per mole of acetyl acetone.

Various water-immiscible diluents may be used, provided the boiling points are a reasonable degree below that of acetyl acetone. Chloroform and carbon tetrachloride are preferred examples. The ratio of solvent to reactants is not critical but to avoid mechanical difficulties in stirring the precipitated complex it is preferable to use solvent to the extent of at least two parts by volume for each part by volume of the reactants.

The initial stage of the reaction, wherein the complex is precipitated and hydrochloric acid is evolved, is advantageously carried out at the temperature of reflux of the reaction mixture. The addition of sulfuric acid to the reaction mixture to decompose the complex may also be carried out at reflux temperature, but is preferably carried out below 30° C. The concentration of acid is not critical but preferably it should be below 50% to avoid side reactions.

I claim:

1. A process for the production of acetyl acetone comprising (a) reacting acetyl chloride with anhydrous aluminum chloride in the presence of an inert water-immiscible liquid diluent which is solvent for the acetyl chloride and non-solvent for the resultant organometallic complex, to precipitate an organometallic complex, (b) decomposing the organometallic complex in the remainder of the reaction mixture with aqueous sulfuric acid to form acetyl acetone and to separate the reaction mixture into an aqueous layer and an organic layer, and (c) recovering the acetyl acetone from the organic layer.

2. A process according to claim 1 wherein further amounts of acetyl acetone are recovered from the aqueous layer by extraction.

3. A process according to claim 1 wherein about nine moles of acetyl chloride are reacted with four moles of aluminum chloride ($AlCl_3$).

4. A process according to claim 3 wherein the aqueous sulfuric acid amounts to a slight excess over the stoichiometric equivalent of the aluminum chloride.

5. A process according to claim 4 wherein the amount of water present in the aqueous sulfuric acid is sufficient to hold in solution all the aluminum salts.

6. A process according to claim 5 wherein the diluent is chloroform.

7. A process according to claim 6 wherein the diluent is used to the extent of at least two parts by volume for each part by volume of the reactants.

8. A process for the production of acetyl acetone comprising (a) reacting acetyl chloride with aluminum chloride in the presence of an inert water-immiscible liquid diluent which is solvent for the acetyl chloride and non-solvent for the resultant organometallic complex, to precipitate an organometallic complex, (b) decomposing the organometallic complex, without separation from the reaction mixture, with aqueous sulfuric acid to form acetyl acetone, in a crude product mixture consisting of at least two phases, an organic phase and an aqueous phase, (c) adding water to the crude product mixture whereby substantially all of the inorganic products are dissolved in the aqueous phase, and (d) recovering acetyl acetone from the organic phase.

References Cited in the file of this patent

UNITED STATES PATENTS

| | | |
|---|---|---|
| 1,661,618 | Muth | Mar. 6, 1928 |
| 1,679,366 | Meiklejohn | Aug. 7, 1928 |
| 2,452,024 | Wilson | Oct. 19, 1948 |

OTHER REFERENCES

Thomas: "Anhydrous Aluminum Chloride in Organic Chemistry," 1941, page 762.